US008407891B2

(12) United States Patent
Owusu et al.

(10) Patent No.: US 8,407,891 B2
(45) Date of Patent: Apr. 2, 2013

(54) METHOD FOR PROVIDING A CONTROLLED SPARK PLUG ORIENTATION IN AN ENGINE STRUCTURE

(75) Inventors: Daniel K Owusu, Grand Blanc, MI (US); David H. Shea, Lake Orion, MI (US)

(73) Assignee: GM Global Technology Operations LLC

( * ) Notice: Subject to any disclaimer, the term of this patent is extended or adjusted under 35 U.S.C. 154(b) by 1204 days.

(21) Appl. No.: 12/251,950

(22) Filed: Oct. 15, 2008

(65) Prior Publication Data

US 2010/0092255 A1 Apr. 15, 2010

(51) Int. Cl.
*B21K 3/00* (2006.01)
*B22D 11/126* (2006.01)
(52) U.S. Cl. .................. 29/888.01; 29/527.1; 29/527.6; 29/558; 408/222
(58) Field of Classification Search ............. 29/888, 29/888.01, 888.011, 592, 527.1, 527.6, 557, 29/558, 401.1, 402.1, 402.09, 402.17, 402.19, 29/270, 278, 281; 408/224, 225, 117, 118, 408/222
See application file for complete search history.

(56) References Cited

U.S. PATENT DOCUMENTS

| | | | | |
|---|---|---|---|---|
| 2,046,041 | A | | 6/1936 | Spitz |
| 3,346,894 | A | * | 10/1967 | Lemelson ................. 408/12 |
| 4,651,374 | A | | 3/1987 | Turchan ................ 10/140 |
| 4,831,674 | A | * | 5/1989 | Bergstrom et al. .......... 470/199 |
| 5,413,438 | A | | 5/1995 | Turchan ................ 409/66 |
| 5,735,240 | A | * | 4/1998 | Ito et al. ................ 123/295 |
| 6,012,882 | A | * | 1/2000 | Turchan ................ 409/74 |
| 8,141,532 | B2 | * | 3/2012 | Kameda ................. 123/169 R |

* cited by examiner

*Primary Examiner* — Sarang Afzali
(74) *Attorney, Agent, or Firm* — Harness, Dickey & Pierce, P.L.C.

(57) ABSTRACT

A spark plug orientation method may include forming a spark plug housing by advancing a tool a first distance in a first axial direction into a spark plug bore to create a spark plug seat using a seat forming portion of the tool. The tool may be displaced a second distance in a second axial direction generally opposite the first axial direction to provide a predetermined axial orientation between the thread forming portion of the tool and the spark plug seat. The spark plug bore may be engaged at a first predetermined rotational position and the tool may be displaced in an orbital motion and in the second axial direction at a predetermined rate to form a threading on the spark plug bore providing a starting point of the threading at a second predetermined rotational position proximate the spark plug seat.

14 Claims, 5 Drawing Sheets

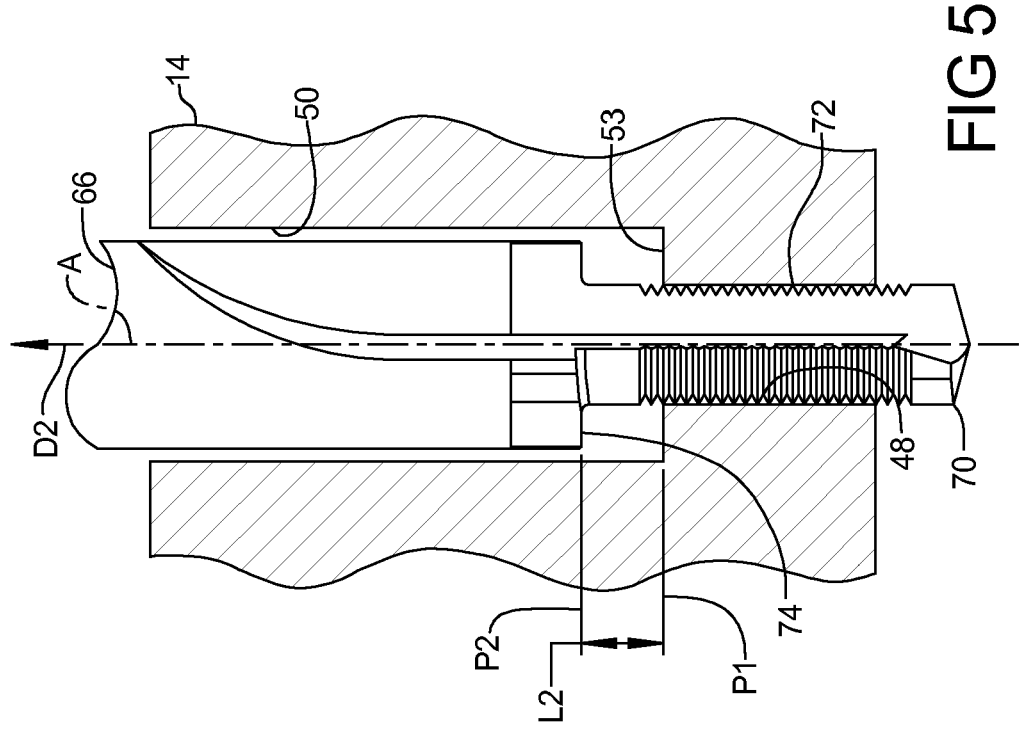
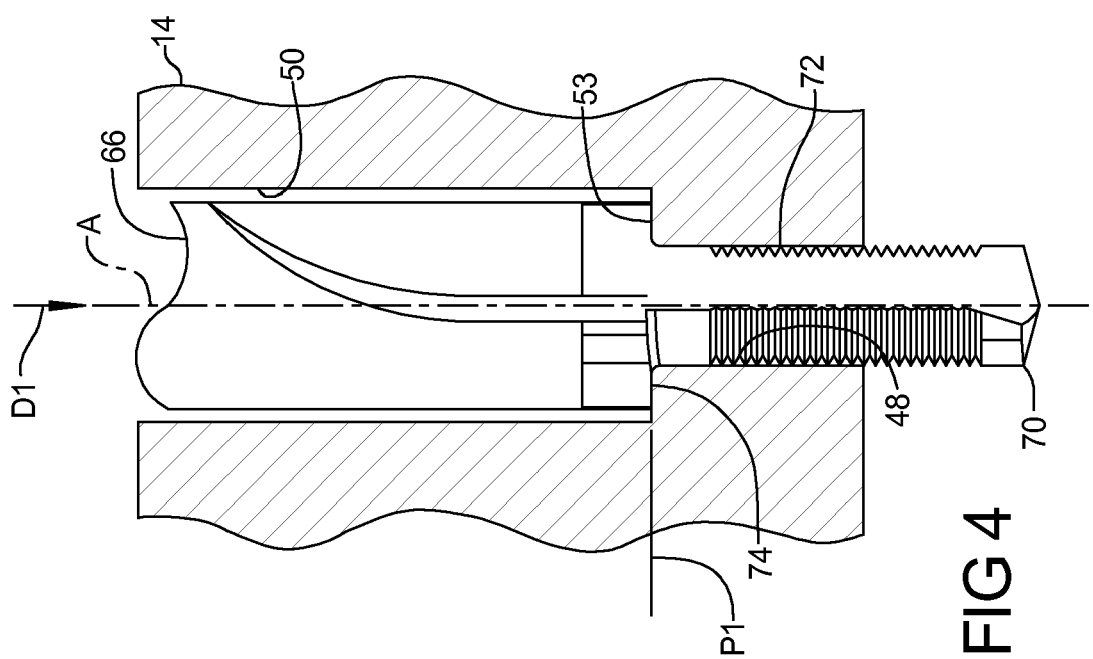

US 8,407,891 B2

METHOD FOR PROVIDING A CONTROLLED SPARK PLUG ORIENTATION IN AN ENGINE STRUCTURE

FIELD

The present disclosure relates to engine assemblies, and more specifically to control of spark plug orientation in engine assemblies.

BACKGROUND

The statements in this section merely provide background information related to the present disclosure and may not constitute prior art.

Orientation of a spark plug within a combustion chamber may affect combustion, and therefore engine performance including power output, emissions and fuel economy. The combustion process may benefit from an orientation of the spark plug where the side electrode is oriented outward relative to the fuel injector. Complicated assembly processes may be required to ensure a desired orientation between the spark plug and the fuel injector resulting in additional cost and assembly time.

SUMMARY

A spark plug orientation method may include forming a spark plug housing in an engine structure using a tool having a longitudinally extending body including a seat forming portion and a thread forming portion. The forming may include advancing the tool a first distance in a first axial direction into the engine structure to create a spark plug seat using the seat forming portion. The thread forming portion may extend from the seat forming portion and into a spark plug bore extending through the spark plug seat into a combustion chamber of the engine structure. The tool may be displaced a second distance in a second axial direction generally opposite the first axial direction after the forming to provide a predetermined axial orientation between the thread forming portion of the tool and the spark plug seat based on the first and second distances. The spark plug bore may be engaged at a first predetermined rotational position and the tool may be displaced in an orbital motion and in the second axial direction beyond the second distance at a predetermined rate to form a threading on the spark plug bore providing a starting point of the threading at a second predetermined rotational position proximate the spark plug seat.

A tool may include a tool body having a shank at a first end, a thread forming region, and a seat forming region located axially between the shank and the thread forming region. The shank may provide a structure for engagement with a drive mechanism. The thread forming region may form a threading on a workpiece and the seat forming region may form a seating region on the workpiece.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4 is a first schematic illustration of a process for forming the spark plug bore according to the present disclosure;

FIG. 5 is a second schematic illustration of a process for forming the spark plug bore according to the present disclosure.

DETAILED DESCRIPTION

Figure 1:
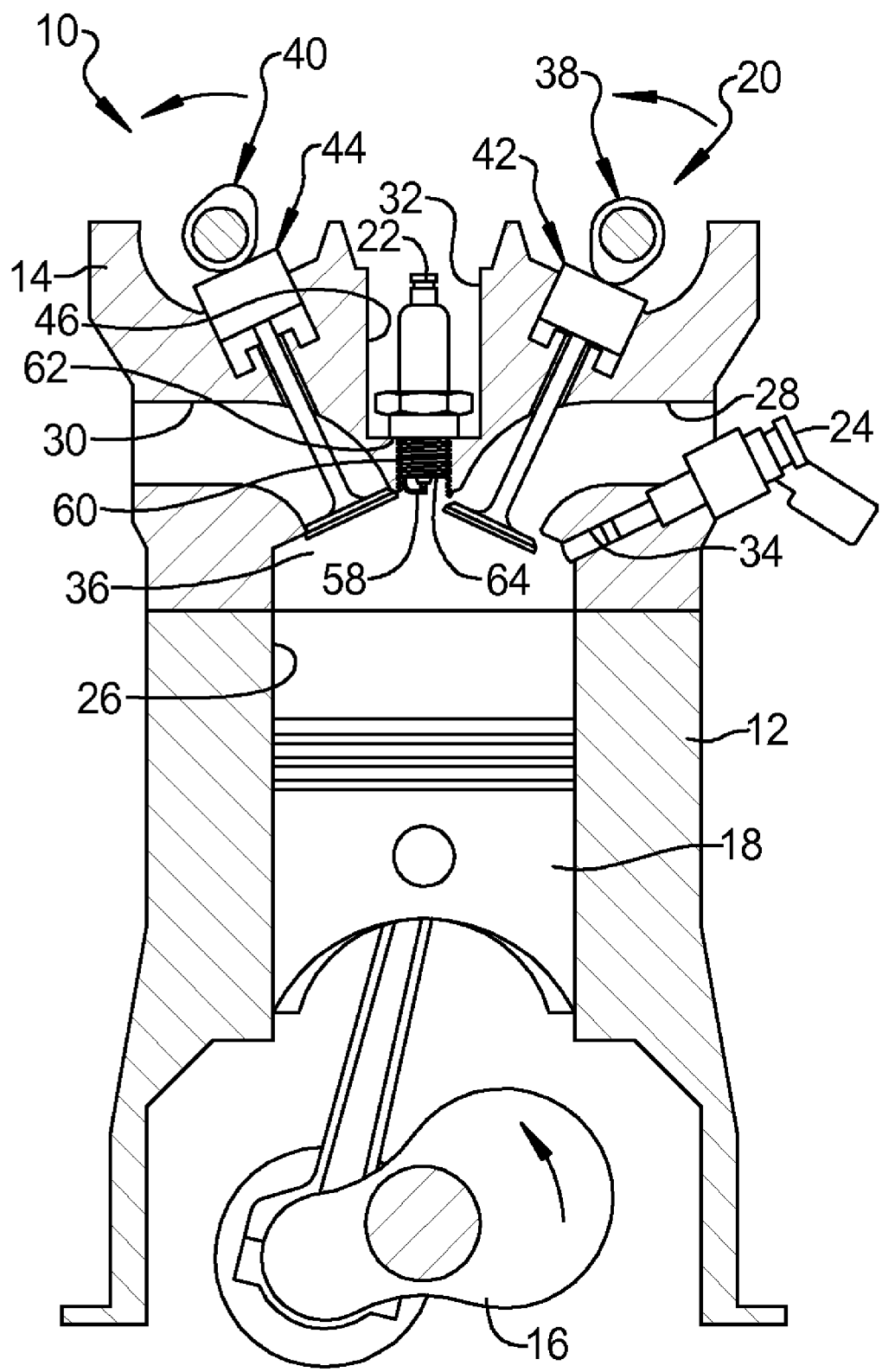
FIG. 1 is a schematic section view of an engine assembly according to the present disclosure.

The following description is merely exemplary in nature and is not intended to limit the present disclosure, application, or uses. It should be understood that throughout the drawings, corresponding reference numerals indicate like or corresponding parts and features.

As seen in FIG. 1, an engine assembly 10 may include an engine block 12, a cylinder head 14, a crankshaft 16, pistons 18 (one of which is shown), a valvetrain assembly 20, a spark plug 22, and a fuel injector 24. The engine block 12 may define cylinder bores 26 (one of which is shown), each having a piston 18 disposed therein. It is understood that the present teachings apply to any number of piston-cylinder arrangements and a variety of engine configurations including, but not limited to, V-engines, inline engines, and horizontally opposed engines, as well as both overhead cam and cam-in-block configurations.

The cylinder head 14 may include intake and exhaust passages 28, 30, a spark plug housing 32, and a fuel injector housing 34. The engine block 12, cylinder head 14, and piston 18 may cooperate to define a combustion chamber 36. The spark plug 22 may be located in the spark plug housing 32, extending into and in communication with the combustion chamber 36. The fuel injector 24 may be located in the fuel injector housing 34, extending into and in communication with the combustion chamber 36, forming a direct injection configuration. The fuel injector 24 may also be located at the top of the cylinder head 14 in a region next to the spark plug 22 to form a central direct injection application. The valvetrain assembly 20 may be supported by the cylinder head 14 and may include intake and exhaust camshafts 38, 40 and intake and exhaust valve assemblies 42, 44. The intake camshaft 38 may be engaged with the intake valve assembly 42 and the exhaust camshaft 40 may be engaged with the exhaust valve assembly 44.

Figure 2:
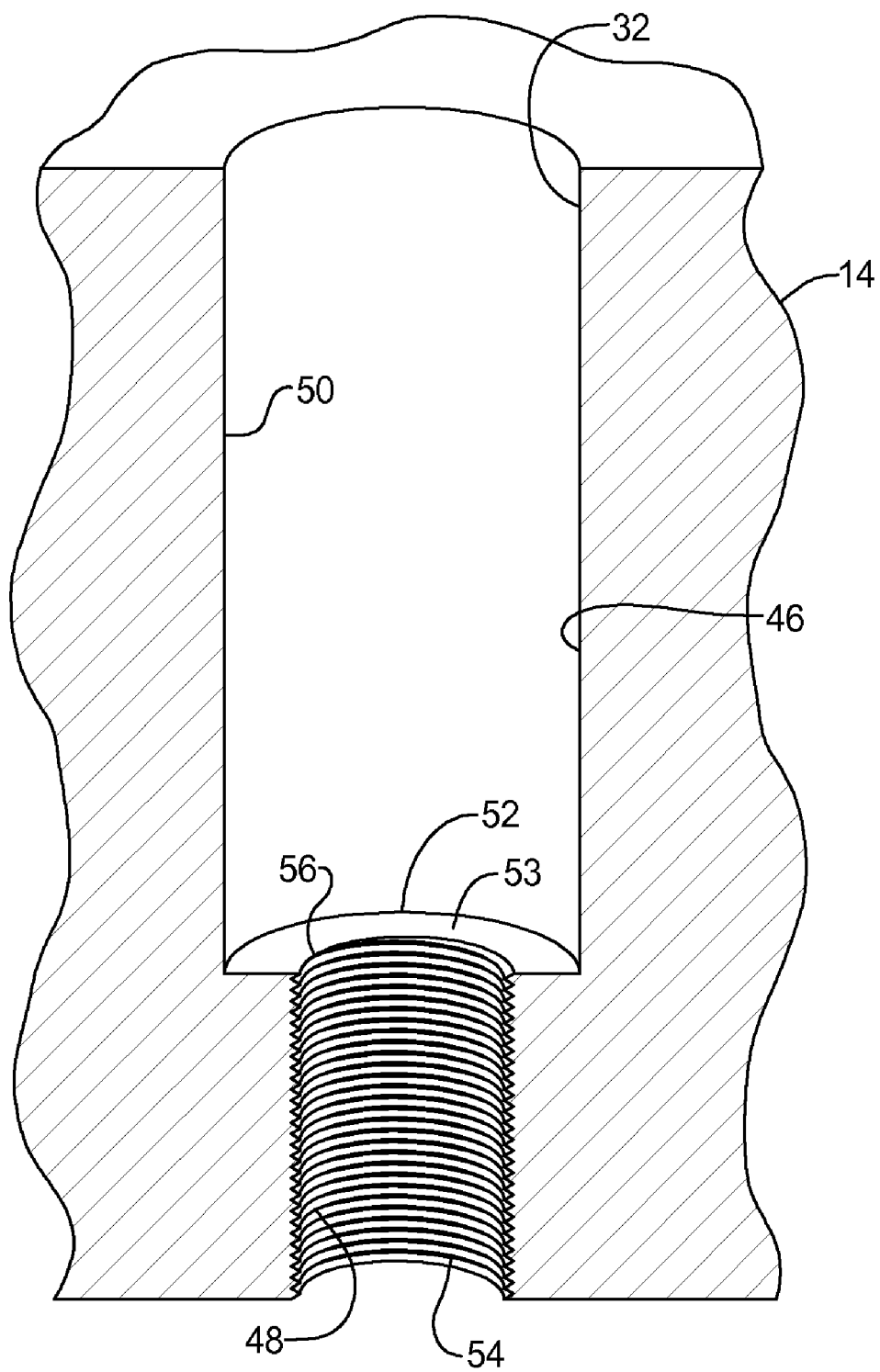
FIG. 2 is a fragmentary perspective section view of a spark plug bore of the engine assembly of FIG. 1.

With additional reference to FIG. 2, the spark plug housing 32 may include a bore 46 formed in the cylinder head 14 and extending through upper and lower surfaces of the cylinder head 14 and into the combustion chamber 36. The bore 46 may include first and second portions 48, 50. The first portion 48 may extend into the combustion chamber 36 and may have a smaller diameter than the second portion 50, forming a stepped region 52 defining a seating surface 53 between the first and second portions 48, 50. The seating surface 53 may extend generally perpendicular to the bore 46 (as seen in FIGS. 2 and 4-6) or may extend at an angle to form a tapered seat (not shown). In either arrangement, the seating surface 53 may provide a high pressure seal between the spark plug 22 and the cylinder head 14.

The first portion 48 may additionally include a spiral threading 54 having a starting point 56 adjacent the stepped region 52. The thread starting point 56 may be located for a predetermined orientation of the spark plug 22. More specifically, the thread starting point 56 may be located at a rotational position that provides for a predictable and repeatable orientation of the side electrode 58 of the spark plug 22 radially outward from the fuel injector 24. As seen in FIG. 1, the spark plug 22 may include a spiral threading 60 corresponding to the spiral threading 54 of the spark plug housing 32 and a seat surface 62. The spiral threading 60 of the spark plug 22 may additionally have a predetermined thread starting point 64 to provide the predetermined orientation of the spark plug 22 relative to the fuel injector 24 when the spark plug 22 is threaded into the spark plug housing 32.

Figure 3:
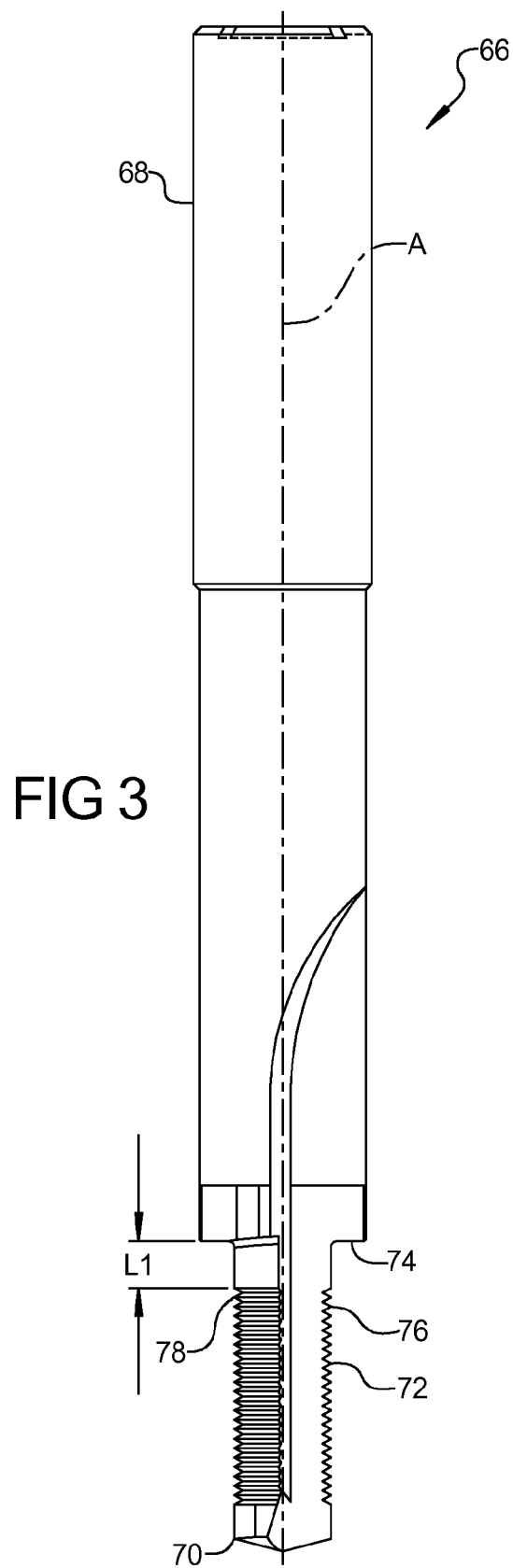
FIG. 3 is a plan view of a tool for forming the spark plug bore according to the present disclosure.

The spark plug housing 32 may be formed in a manner to create a repeatable and controlled orientation of the thread starting point 56 of the spiral threading 54. With reference to FIG. 3, the spark plug housing 32 may be at least partially formed from a tool 66 including a shank 68 at the first end, a drilling region 70 at a second end, a thread forming region 72 between the drilling region 70 and the shank 68 and a seat, or spotface, forming region 74 located between the thread forming region 72 and the shank 68. The shank 68 may provide engagement between the tool and a driving mechanism (not shown). The drilling region 70 may have a diameter that is greater than or equal to an outermost diameter of the thread forming region 72. The thread forming region 72 may be in the form of a thread milling portion including cutters 76. The cutters 76 may be circumferentially aligned with and equally spaced from one another. A fixed axial spacing (L1) may exist between the seat forming region 74 of the tool 66 and a crest 78 of a first of the cutters 76. Since the distance between adjacent cutters 76 is known, the axial spacing between seat forming region 74 of the tool 66 and any one of the cutters 76 is also known.

In the present non-limiting example, the cylinder head 14 may form a workpiece for use with the tool 66. As seen in FIG. 4, the tool 66 may be rotated about its central axis (A) and advanced in a first axial direction (D1) into the second portion 50 of the bore 46 to drill the first portion 48 of the bore 46. The first portion 48 of the bore 46 may initially include a pilot hole or may be completely formed by drilling with the tool 66. The tool 66 may be advanced a predetermined distance where the seating surface 53 is formed at a first axial position (P1) using the seat forming region 74 of the tool 66. As seen in FIG. 5, the tool 66 may then be retracted a predetermined axial distance (L2) in a second axial direction (D2) generally opposite the first axial direction (D1) to a second axial position (P2), providing a predetermined axial orientation between the tool 66 and the cylinder head 14. More specifically, the thread forming region 72 of the tool 66 may be located at a predetermined axial position relative to the seating surface 53. Therefore, each of the cutters 76 may be at a known predetermined axial position relative to the seating surface 53.

Once in the desired axial position, the tool 66 may be orbitally displaced while the tool is further retracted in the second axial direction (D2) to form the spiral threading 54 on the spark plug housing 32. The tool 66 may be operated and controlled in a variety of ways including, but not limited to, computerized numerically controlled (CNC) machines such as a multi-axis CNC spindle with interpolation capabilities. As discussed above, the spiral threading 54 may terminate at a predetermined rotational position (i.e., thread starting point 56).

Figure 6:
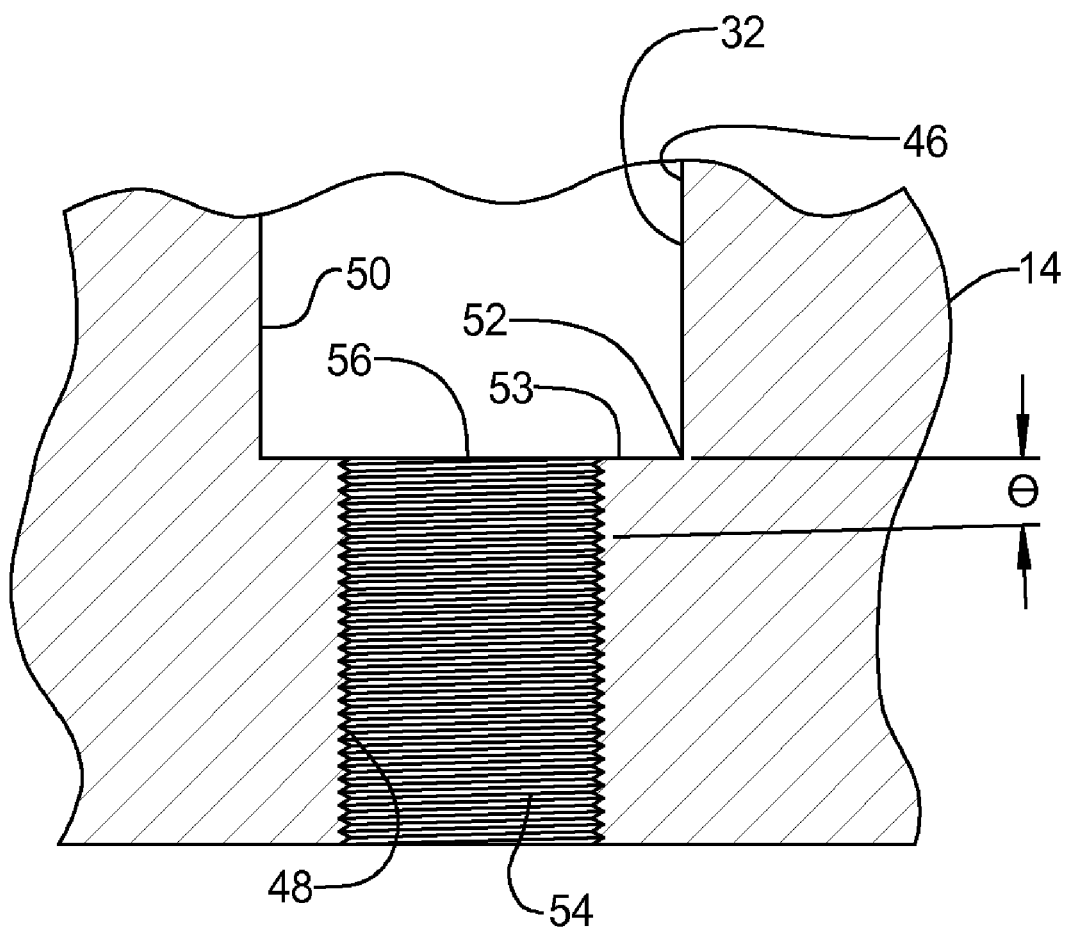
FIG. 6 is an additional fragmentary perspective section view of the spark plug bore of the engine assembly of FIG. 1.

More specifically, the predetermined axial distance (L2) that the tool 66 is retracted prior to thread forming may be determined based on the predetermined rotational position of the thread starting point 56, the fixed axial spacing (L1) between the seat forming region 74 of the tool 66 and the cutters 76, and a predetermined thread angle (θ). As seen in FIG. 6, the predetermined thread angle (θ) may be referenced relative to the seating surface 53 and controlled by the rate the tool 66 is retracted during the thread forming. The predetermined thread angle (θ) provides a known axial spacing between the threads of the spiral threading 54 and the seating surface 53. Therefore, a rotational starting point for thread cutting by the tool 66 may be determined based on a known axial orientation of the cutters 76 relative to the seating surface 53 and based on the desired thread starting point 56.

What is claimed is:

1. A method comprising:
   forming a spark plug housing in an engine structure using a tool having a longitudinally extending body including a seat forming portion and a thread forming portion, the forming including advancing the tool a first distance in a first axial direction into the engine structure to create a spark plug seat using the seat forming portion, the thread forming portion extending from the seat forming portion and into a spark plug bore extending through the spark plug seat;
   displacing the tool a second distance in a second axial direction generally opposite the first axial direction after the forming to provide a predetermined axial orientation between the thread forming portion of the tool and the spark plug seat based on the first and second distances; and
   engaging the spark plug bore at a first predetermined rotational and axial position and displacing the tool in an orbital motion and in the second axial direction beyond the second distance at a predetermined rate to form a threading on the spark plug bore providing a starting point of the threading at a second predetermined rotational position proximate the spark plug seat.

2. The method claim 1, wherein the thread forming portion of the tool has a fixed axial spacing from the seat forming portion of the tool, the predetermined axial orientation of the thread forming portion of the tool relative to the spark plug seat of the engine structure being based on the fixed axial spacing between the seat forming portion of the tool and the thread forming portion of the tool.

3. The method of claim 2, further comprising determining a desired thread angle of the threading on the spark plug bore and determining the first predetermined rotational position based on the desired thread angle and the second distance.

4. The method of claim 2, wherein the thread forming portion of the tool forms a thread milling tool having cutters circumferentially aligned with and axially spaced from one another, the displacing the tool the second distance including providing a predetermined axial orientation of crests of the cutters relative to the spark plug seat of the engine structure.

5. The method of claim 3, wherein the second distance is a predetermined distance.

6. The method of claim 2, further comprising determining a desired thread angle of the threading on the spark plug bore and determining the second distance based on the first predetermined rotational position and the desired thread angle.

7. The method of claim 1, further comprising threading a spark plug into the spark plug bore, the threading on the spark plug bore providing engagement with a threading on the spark plug, the starting point of the threading on the spark plug bore and a starting point of the threading on the spark plug providing a predetermined orientation for the spark plug within a combustion chamber of the engine structure.

8. The method of claim 7, wherein the predetermined orientation includes a side electrode of the spark plug being located outward from a fuel injector extending into the combustion chamber.

9. The method of claim 8, wherein the spark plug seat provides an axial stop for the spark plug.

10. The method of claim 1, wherein the tool includes a drilling portion, the forming the spark plug housing including rotating the tool about a longitudinal axis of the tool body to form the spark plug bore.

11. The method of claim 10, wherein rotation of the tool is maintained while displacing the tool the second distance.

12. The method of claim 1, wherein the forming the threading on the spark plug bore includes thread milling.

13. A method comprising:
  forming a spark plug housing in an engine structure using a tool having a longitudinally extending body including a drilling portion, a seat forming portion and a thread forming portion, the forming including advancing the tool a first distance in a first axial direction into the engine structure to create a spark plug bore using the drilling portion and a spark plug seat surrounding the spark plug bore using the seat forming portion, the thread forming portion extending from the seat forming portion and into the spark plug bore through the spark plug seat;
  displacing the tool a second distance in a second axial direction generally opposite the first axial direction after the forming to provide a predetermined axial orientation between the thread forming portion of the tool and the spark plug seat based on the first and second distances; and
  engaging the spark plug bore at a first predetermined rotational and axial position and displacing the tool in an orbital motion and in the second axial direction beyond the second distance at a predetermined rate to form a threading on the spark plug bore providing a starting point of the threading at a second predetermined rotational position proximate the spark plug seat.

14. The method of claim 13, further comprising threading a spark plug into the spark plug bore, the threading on the spark plug bore providing engagement with a threading on the spark plug, the starting point of the threading on the spark plug bore and a starting point of the threading on the spark plug providing a predetermined orientation for the spark plug within a combustion chamber of the engine structure.

* * * * *